Patented Jan. 16, 1951

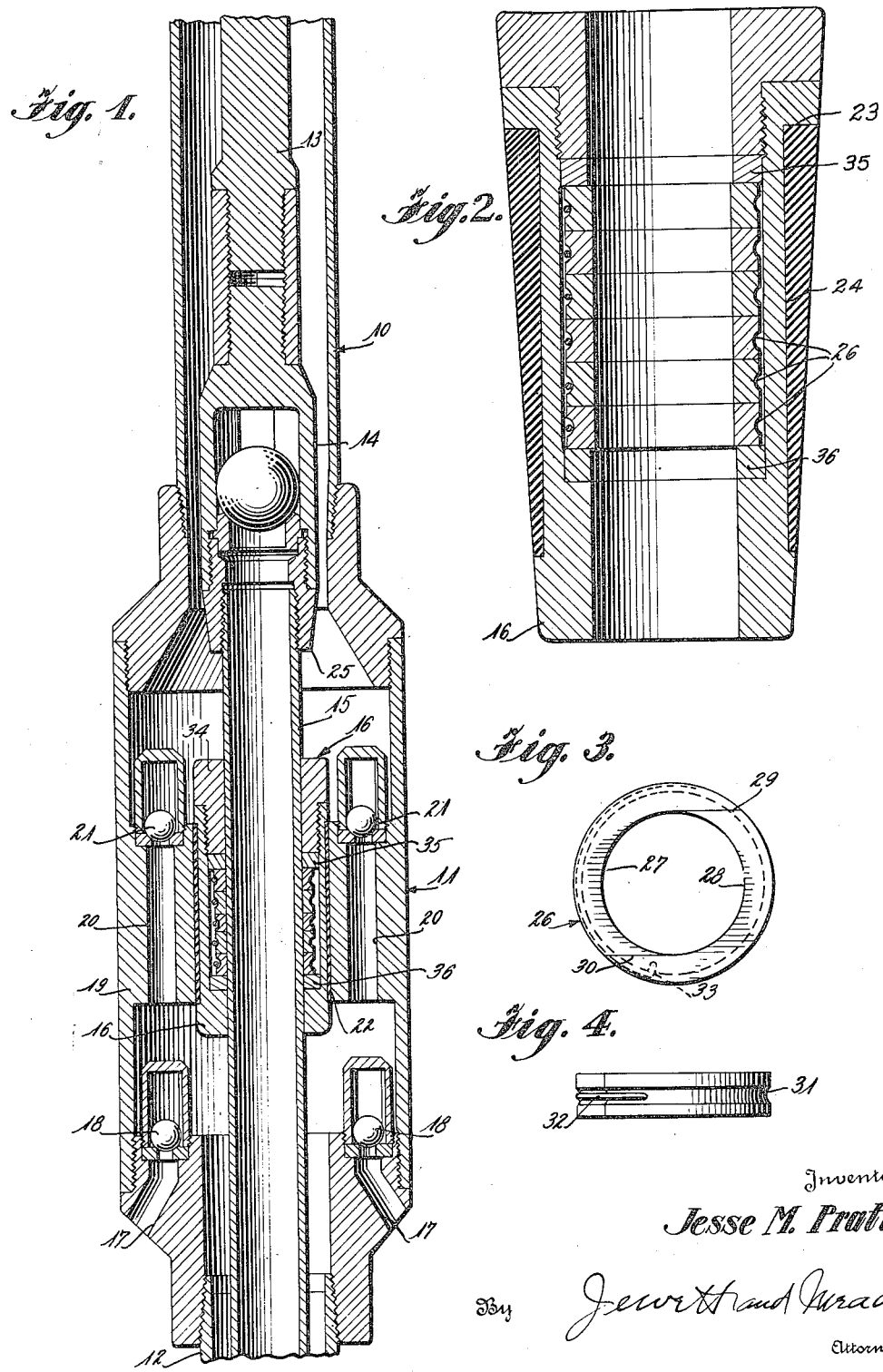

2,538,592

UNITED STATES PATENT OFFICE 2,538,592

DOUBLE ACTING PUMP

Jesse M. Pratt, Houston, Tex., assignor to Howard F. Smith, Houston, Tex.

Application January 10, 1947, Serial No. 721,210

2 Claims. (Cl. 103—190)

This invention relates to double acting pumps.

It is an object of the invention to provide a pump having novel provision for removal of the reciprocating portion from the stationary portion.

It is a further object to provide a gland removable with a reciprocable pump rod and provided with a sealing coating on its exterior to prevent freezing of the gland with its seat.

It is a further object of the invention to provide a novel packing ring gland with means housing rigid material packing rings in operable relation to the pump rod.

Further objects will appear from the following description when read in connection with the accompanying drawings showing an illustrative embodiment of the invention and wherein Figure 1 is a vertical central section through a portion of a pump;

Figure 2 is a detail vertical section, on an enlarged scale, showing the gland of Figure 1 and the taper of the gland exaggerated;

Figure 3 is a plan view; and

Figure 4 is an edge view of one of the packing rings utilized in the invention.

As shown, the device comprises a pipe 10 having screw threaded connection with a barrel 11 which in turn has screw threaded connection with pipe 12. Mounted to reciprocate in the pipe 10 there is shown the sucker rod 13 coupled by cage 14 with the pipe 15 passing through gland 16.

The barrel 11 is shown as formed with inlet ports 17 fitted with check valves 18. The barrel is shown as formed with a thickened portion 19 provided with passages 20 controlled by pump valves 21.

It will be understood that the pipe 12 is provided with a foot valve or check valve at its lower end, not shown, and that the lower end of pipe 15 terminates above the said check valve and is itself provided with an upwardly opening check valve, shown in cage 14, these check valves being conventional.

The sucker rod and pipe 15 are shown in Figure 1 at substantially the limit of their downward stroke.

The pipe 15 is shown as reciprocable in the gland 16, which gland is in fluid-tight relation with seat 22 formed in the barrel 11, the external surface of the gland and the coacting surface of the seat being complementally formed on the surface of a cone of slight angle.

To prevent freezing of the gland to the seat and to assist in providing a fluid-tight joint, the gland is shown as provided with a layer or coating 24 desirably formed of a soft metal, solder being at present preferred. As shown, a slight recess 23 is shown as formed at the exterior of the gland for reception of the coating.

The valve at the lower end of the pipe 15 is of a size to permit it to pass easily through the seat 22. When the pipe 10, barrel 11 and pipe 12 are in the well, the pipe 15 bearing its check valve and the gland 16 may be lowered by the sucker rod until the parts come to the position shown in Figure 1. The coupling 25 may then be caused to contact the gland to drive it to its seat. The valve casing at the lower end of pipe 15 may be utilized to break the gland from its seat for withdrawal.

To provide a liquid-tight seal about the pipe 15, the gland is formed with a plurality of packing rings 26 shown as formed of two sections 27, 28 similar to each other, joining at tangential joints 29, 30.

The combined sections are formed with a circumferential recess 31 to receive a contracting spring 32 formed with an inturned end 33 to enter a recess in the bottom of recess 31 as indicated in Figure 3. The spring 32 is shown as substantially semicircular, locking to section 28 and reacting upon section 27.

The packing ring sections are preferably formed of rigid material as steel, cast iron or even molded plastic. The combined axial extent of the plurality of rings when assembled in the gland is such that when the plug 34 is screwed home upon a ring 35 and with a ring 36 below them, they will not be frozen against slight movements of expansion and contraction to follow any slight differences of the external diameter of pipe 15 in its different portions as it reciprocates.

The action of a double acting pump of this type is well understood by those skilled in the art.

Minor changes in the physical embodiment of the invention may be made within the scope of the appended claims without departing from the spirit of the invention.

I claim:

1. A double acting pump comprising, in combination: a pump barrel provided with a pump valve, a check valve, and a gland seat; a gland seating in said gland seat, said gland and seat formed with complemental frusto conical surfaces; one of said surfaces formed with a recess extending throughout a major portion of its axial extent and continuously about its periphery and terminating upwardly and downwardly at abrupt shoulders and carrying a coating of relatively soft metal filling said recess; a hollow pump rod reciprocable in liquid tight relation through said gland and removable with said gland from the seat; said coating preventing freezing of said frusto conical surfaces.

2. The combination of claim 1 in which said coating is formed of solder.

JESSE M. PRATT.

REFERENCES CITED

The following references are of record in the file of this patent:

UNITED STATES PATENTS

| Number | Name | Date |
|---|---|---|
| 150,160 | Horsley | Apr. 28, 1874 |
| 470,302 | Martin et al. | Mar. 8, 1892 |
| 1,501,927 | Shepard | July 22, 1924 |
| 1,544,142 | Esienhauer | June 30, 1925 |
| 1,642,745 | Pearce et al. | Sept. 20, 1927 |
| 1,746,901 | Naiman | Feb. 11, 1930 |